(12) United States Patent
Battlogg (10) Patent No.: US 11,719,034 B2
(45) Date of Patent: Aug. 8, 2023

(54) DEVICE COMPRISING COMPONENTS THAT CAN BE MOVED RELATIVE TO EACH OTHER, AND METHOD

(71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St Anton i.M. (AT)

( * ) Notice: Subject to any disclaimer, the term of this patent is extended or adjusted under 35 U.S.C. 154(b) by 277 days.

(21) Appl. No.: 17/252,110

(22) PCT Filed: Feb. 13, 2019

(86) PCT No.: PCT/EP2019/053601
§ 371 (c)(1),
(2) Date: Dec. 14, 2020

(87) PCT Pub. No.: WO2019/158612
PCT Pub. Date: Aug. 22, 2019

(65) Prior Publication Data
US 2021/0254388 A1    Aug. 19, 2021

(30) Foreign Application Priority Data
Feb. 13, 2018 (DE) .......................... 102018103112.2

(51) Int. Cl.
*E05F 15/622* (2015.01)
*E05F 3/20* (2006.01)
(Continued)

(52) U.S. Cl.
CPC .............. *E05F 15/622* (2015.01); *E05F 3/20* (2013.01); *E05F 15/614* (2015.01); *F16F 9/53* (2013.01); *F16F 9/535* (2013.01)

(58) Field of Classification Search
CPC ..... E05F 15/622; E05F 15/611; E05F 15/616; E05F 15/603; E05F 3/20; F16F 9/53; F16F 9/535
See application file for complete search history.

(56) References Cited

U.S. PATENT DOCUMENTS 4,637,272 A * 1/1987 Teske ................... F16H 25/205
                                            244/99.2
4,714,006 A * 12/1987 Tootle ..................... F02K 1/76
                                            74/105
(Continued)

FOREIGN PATENT DOCUMENTS

DE          9218638 U1     11/1994
DE         19528457 A1      2/1997
(Continued)

*Primary Examiner* — Justin B Rephann
(74) *Attorney, Agent, or Firm* — Laurence A. Greenberg; Werner H. Stemer; Ralph E. Locher (57) ABSTRACT

A device has at least two components that can be moved relative to each other. A drive device is provided with a drive housing and a drive shaft in order to bring about a relative movement of a first component to a second component. If the drive shaft is coupled in a rotationally fixed manner to the second component, the drive housing is rotatably accommodated on one of the two components and can be coupled by an actuator in a rotationally fixed manner to the first component and can be decoupled therefrom. If the drive housing is coupled in a rotationally fixed manner to the second component, the drive shaft can be coupled by an actuator in a rotationally fixed manner to the first component and can be decoupled therefrom.

17 Claims, 6 Drawing Sheets

(51) Int. Cl.
*E05F 15/614* (2015.01)
*F16F 9/53* (2006.01)

(56) References Cited

U.S. PATENT DOCUMENTS

| | | | |
|---|---|---|---|
| 5,944,151 | A | 8/1999 | Jakobs et al. |
| 6,334,276 | B1 | 1/2002 | Marin-Martinod et al. |
| 7,232,016 | B2 | 6/2007 | Namuduri |
| 8,256,311 | B2 * | 9/2012 | Payne ................ F16H 25/2021 74/89.37 |
| 8,960,031 | B2 * | 2/2015 | Keech .................. F16H 25/205 244/99.3 |
| 9,091,309 | B2 | 7/2015 | Battlogg |
| 9,500,236 | B2 | 11/2016 | Mueller et al. |
| 2008/0203223 | A1 * | 8/2008 | Cyrot ...................... B64C 13/00 244/99.3 |
| 2014/0197717 | A1 | 7/2014 | Busch |
| 2016/0216763 | A1 | 7/2016 | Vanhelle et al. |
| 2018/0202212 | A1 * | 7/2018 | Xiao ........................ E05F 3/00 |
| 2019/0242171 | A1 | 8/2019 | Wittelsbuerger et al. |

FOREIGN PATENT DOCUMENTS

| | | |
|---|---|---|
| DE | 102004058736 A1 | 7/2005 |
| DE | 102010055833 A1 | 3/2012 |
| DE | 102016113353 A1 | 1/2018 |
| EP | 2754822 A2 | 7/2014 |
| EP | 2789869 A2 | 10/2014 |
| WO | 2012110569 A2 | 8/2012 |
| WO | 2015033034 A1 | 3/2015 |

\* cited by examiner

DEVICE COMPRISING COMPONENTS THAT CAN BE MOVED RELATIVE TO EACH OTHER, AND METHOD

BACKGROUND OF THE INVENTION

Field of the Invention

The present invention relates to a device and to a method having at least two components that are movable relative to each other. This herein comprises a drive installation having a drive housing and a drive shaft so as to cause a relative movement of a first in relation to a second of the components.

In one specific design embodiment, a device according to the invention comprises a brake and an electric motor and two components which are movable, and in particular rotatable or pivotable, relative to each other. For example, a device according to the invention can be configured as a car door and comprise an actively pivotable door which possesses an electric drive so as to enable motorized pivoting.

Various devices having at least two components that are movable relative to each other are known from the prior art. Devices having a drive installation for generating a relative movement between the first and the second component enable the two components to be moved relative to each other in a controlled manner. This enables comfortable operation, or self-acting opening and closing, respectively, of a vehicle door, for example. It is however disadvantageous that a manual adjustment of the two components in relation to each other, that is to say without any electrical assistance, often requires more force than would actually be necessary. The required activation force of a vehicle door can be excessive for a child at the rear doors in the event of a deactivated drive as may be the case, for example, in the event of a vehicle collision. The child is unable to move the door and thus cannot alight.

A specific type of user would like to manually open the door in everyday use. Because of the drive unit having an electric motor and potentially further components, and with the gearbox with a comparatively high gear ratio required in most instances, this is possible only with a high effort in terms of force. Moreover, the gearbox herein is often very audible. Neither the increased activation force for the door nor the noise is desirable in particular in the case of premium vehicles.

BRIEF SUMMARY OF THE INVENTION

It is therefore the object of the present invention to provide a device and a method having at least two components that are movable relative to each other, said components, in particular when non-energized, preferably being able to be moved with a low effort in terms of force.

This object is achieved by a device as claimed and by a method as claimed. Preferred refinements of the invention are the subject matter of the dependent claims. Further advantages and features of the present invention are derived from the general description and the description of the exemplary embodiments.

A device according to the invention comprises at least two components that are movable relative to each other. At least one drive installation having a drive housing and a drive shaft is comprised so as to cause a relative movement of a first in relation to a second of the components. The drive shaft is coupled in a rotationally fixed manner to the second component, and the drive housing is rotatably received on one of the two components and, controlled by means of an actuator, is able to be coupled in a rotationally fixed manner to the first component and is able to be uncoupled therefrom. Or the drive housing is coupled in a rotationally fixed manner to the second component, and the drive shaft, controlled by means of an actuator, is able to be coupled in a rotationally fixed manner to the first component and is able to be uncoupled therefrom.

The device according to the invention has many advantages. A significant advantage lies in that the drive housing, controlled by means of an actuator, is able to be coupled in a rotationally fixed manner to the first component and is able to be uncoupled therefrom, or that the drive housing is coupled in a rotationally fixed manner to the second component and that the drive shaft, controlled by means of an actuator, is able to be coupled in a rotationally fixed manner to the first component and is able to be uncoupled therefrom.

In practice, it is possible according to the invention that the drive housing is rotatably received on the first of the two components, and that the drive shaft is coupled in a rotationally fixed manner to the second component. The drive housing is able to be coupled in a rotationally fixed manner to the first component by way of an actuator. On account thereof it is enabled that, for example for an automatic relative movement of the two components in relation to each other, both components are in each case connected in a rotationally fixed manner to either of the drive shaft and the drive housing. An adjustment of the two components that are movable relative to each other can in this instance take place by way of the drive. In contrast however, if a manual adjustment is to take place, thus when the door is operated purely manually and without any motorized assistance, one of the two components can be uncoupled either from the drive housing or the drive shaft such that a manual movement of the two components in relation to each other is possible with a minor effort in terms of force. It is not necessary for the drive housing, or the drive shaft, respectively, to be rotated relative to the drive housing when a manual adjustment is desired.

In one preferred refinement, the first component is equipped with a rotary receptacle, and the second component is rotatably received on the rotary receptacle. In a simple design embodiment, the rotary receptacle can be configured as an axle unit or a coupling rod, respectively, for example, and the second component is correspondingly designed and rotatably received on the rotary receptacle. However, it is also possible for the rotary receptacle to be configured as a hollow-cylindrical receptacle or to comprise such a hollow-cylindrical receptacle. In this instance, the second component can comprise an axle component which is rotatably received on the hollow-cylindrical receptacle. In particularly preferred design embodiments, the first component is equipped with a rotary receptacle in the form of an axle unit or a coupling rod.

In advantageous design embodiments, a third component is coupled to the second component. The third component is in particular rotatably coupled to the second component.

In particularly preferred design embodiments, at least two connector units that are movable relative to each other are comprised. A first of the connector units is preferably coupled to the first component or is configured thereon.

The second connector unit is in particular coupled to the second component or to the third component. The first and the second connector unit can in each case be connected in a rotationally fixed or rigid manner, respectively, to the respective component. However, it is also possible for one connector unit or both connector units to be pivotably connected to the respective component.

Two mutually engaging spindle units are preferably disposed between the two connector units. One spindle unit is preferably configured as a threaded spindle and the other spindle unit is configured as a spindle nut. On account of two mutually engaging spindle units, a linear movement can be converted to a rotary movement, or a rotary movement can be converted to a linear movement, respectively. In advantageous design embodiments, at least the first spindle unit is preferably at least in part composed of a plastics material having a preferably embedded lubricant. Self-lubrication can be achieved on account thereof, for example. Moreover, the noise emissions are reduced on account of a spindle unit that is composed of a plastics material, on account of which silent running can be achieved, depending on the design embodiment. The spindle units preferably convert a linear movement of the connector units relative to each other to a rotary movement of the spindle units. However, other mechanisms for converting a rotary movement to a linear movement and vice versa are also conceivable; a spur gear, a bevel gear, a crown gear, and/or a rack can thus be provided, for example.

The second component is preferably configured as a threaded spindle, and the third component is configured as a spindle nut. An axial displacement of the threaded spindle in relation to the spindle nut is achieved in a relative rotary movement of the second or the third component in this instance.

A relative mutual axial position of the spindle units preferably varies in a relative movement of the connector units in relation to each other. In particular, the spindle nut radially surrounds the threaded spindle. The threaded spindle is preferably configured so as to be at least 30% longer than the spindle nut. The threaded spindle is in particular rotatable in relation to the spindle nut and in relation to the rotary receptacle.

In advantageous design embodiments, an annular-cylindrical cavity is formed so as to be radially between the rotary receptacle and the first spindle unit.

A cylindrical sleeve composed of a magnetically conducting material is in particular received in the first spindle unit and in particular in the annular-cylindrical cavity. The cylindrical sleeve is in particular connected in a rotationally fixed manner to the first spindle unit. The (remaining) cavity is preferably partially or completely filled with a magnetorheological medium.

A controllable brake installation is particularly preferably comprised. The brake installation is in particular configured as a controllable rotary brake. The device is preferably configured as a door installation or comprises such a door installation. If the door installation is configured as a door component of a motor vehicle, one of the connector units is thus preferably coupled to the body and the other of the connector units is coupled to the door. In this instance, a movement of the door installation between a closing position and an opening position is preferably at least partially able to be damped in a controlled manner. In particular, the movement of the door installation is able to be braked, and the door installation is preferably able to be secured at arbitrary angular positions.

A device having a pivotable door installation which comprises a controllable brake installation and in which the door installation can be opened and/or closed in a controlled manner and with motorized assistance by a drive installation has many advantages. Such a device is particularly advantageous when only a minor brake torque has to be overcome when manually opening or manually closing the door installation. This here is achieved in that a rotationally fixed coupling of the drive housing, or of the drive shaft, respectively, to the corresponding component can be generated and cancelled again when required.

In preferred refinements, the brake installation is effective between the rotary receptacle of the first component and of the second component.

In all design embodiments it is preferable for the brake installation to be configured as a magnetorheological transmission device and to comprise at least one electric coil. The magnetorheological transmission device is in particular disposed so as to be radially within the first spindle unit.

The electric coil preferably has windings that are wound about the rotary receptacle. The magnetorheological transmission device comprises in particular at least one magnetic circuit which comprises an axial portion in the rotary receptacle, an axial portion in the cylindrical sleeve and/or in the first spindle unit, the electric coil, and on at least one axial side of the electric coil at least one rotary element that is disposed in the radial gap between the rotary receptacle and the first spindle unit. In particular, a plurality of magnetic circuits are present.

In all design embodiments it is preferable for at least one rotary element to be in each case disposed on both axial sides of the electric coil. The rotary elements can be spherically configured. It is possible and preferable for the rotary elements to be cylindrically configured. A plurality of rotary elements are preferably disposed so as to be distributed on the circumference of the rotary receptacle on at least one axial side of the electric coil. In particular, the magnetic circuit on both axial sides of the electric coil, in the radial gap between the rotary receptacle and the threaded spindle, comprises rotary elements that are disposed therein.

In all design embodiments it is preferable for an electric connector cable for the electric coil to be routed through a duct in the rotary receptacle. An electric connector cable for the drive installation is preferably also routed through a duct, or the duct, respectively, in the rotary receptacle. It is possible and preferable for a power cable to be configured as a buffer spring. In the case of power cables of this type, the cable can be rotated or wound, respectively, about one, two, three, four, five, six, seven, eight, nine or ten revolutions. This enables a significant travel in both directions. It is also possible that the power cables are conceived for even more windings. Alternatively, a transmission of power can also take place by way of collector rings and/or a buffer spring.

The rotary receptacle is preferably pivotable about a pivot axle that is aligned so as to be transverse to the coupling rod.

In preferred refinements, the first spindle unit is received so as to be axially fixed on the rotary receptacle, and the first spindle unit extends across an axial adjustment range.

In advantageous design embodiments, the drive installation comprises an electric drive motor. However, it is also possible for a pneumatic and/or hydraulic drive motor to be provided. It is also possible for two different drive motors to be provided.

An angle sensor preferably detects an angular position of the drive housing. On account thereof, it becomes possible for the drive housing to be moved in a targeted manner to a predetermined or desired angular position. In the absence of an angle sensor it is conceivable that the electric connector cable of the drive installation is ever further twisted open in one direction. This can be reliably counteracted by an angle sensor.

In all design embodiments it is preferable for at least one path sensor to be provided so as to detect at least one axial position. By way of a fixed coupling between a radial movement and an axial movement, a defined radial position can also be determined by way of an axial position. An angle sensor for determining an angular position of the drive housing is however also expedient when a path sensor is provided for an axial position, because angular distortions could arise by virtue of the uncoupling between the drive housing and one of the components, or between the drive shaft and one of the components, respectively. Any undesirable permanent twisting of the drive cable can be prevented by means of an (absolute) angle sensor.

In all design embodiments it is possible for the drive installation to comprise a gearbox and for the drive shaft to be the gearbox shaft.

In particular, one of the components is configured as a door component, and another of the components is configured as a frame component. The connector units are preferably connected thereto.

In preferred refinements, the actuator by way of a pre-load unit is biased toward an uncoupled position. In this instance, coupling takes place only once the actuator is activated. The actuator can in particular be magnetically, pneumatically, hydraulically, and/or (preferably) electrically operated.

The actuator preferably comprises an out-of-round operative face which interacts with a mating out-of-round operative face on the drive installation. In simple design embodiments, an external toothing in which a tooth segment of the actuator engages in a form-fitting manner is configured on the drive installation so as to, by means of the actuator, establish a coupled connection in a targeted manner.

In all design embodiments it is possible and preferable for the drive installation to be rotatably mounted on the first component and/or the second component.

In one preferred design embodiment, a refinement of the device comprises at least two components that are movable relative to each other, wherein the first component is equipped with a rotary receptacle, and wherein the second component is rotatably received on the rotary receptacle. A third component is coupled to the second component. Two connector units that are movable relative to each other and at least one controllable brake installation are comprised. The brake installation is configured as a controllable rotary brake so as to in a controlled manner at least partially damp a movement of a door installation between a closing position and an opening position. The first connector unit is configured on the first component, and the second connector unit is pivotably coupled to the third component. The pivot axle is aligned so as to be transverse to a rotation axle of the second component.

Such a design embodiment has many advantages. A significant advantage lies in the fact that the first connector unit is configured on the first component. On account thereof, it is not necessary for the device to be pivoted at both ends when opening a door installation. The required installation space becomes significantly smaller. The second connector unit is pivotably coupled to the third component. The pivot axle on the third component run so as to be transverse to a rotation axle of the first component. Only a minor installation space when in operation is thus required. The device can be constructed in a very compact manner.

The first connector unit is preferably connected in a rotationally fixed and in particular rigid manner to the first component. The first connector unit can in particular be configured so as to be integral to the first component.

The third component by way of a (substantially) bar-shaped coupling profile is preferably pivotably coupled to the second connector unit. On account thereof, there is only one pivot axle present on the main body of the device, said pivot axle running so as to be transverse to a rotation axle of the second component. The main body of the device can also be referred to as the main module. The main body of the device comprises in particular the first component, the second component, and the third component and is preferably substantially formed by said components.

The coupling profile at a first end is preferably pivotably coupled to the third component and/or at a second end is pivotably coupled to the second connector unit. The two pivot axles on the first and the second end herein preferably lie so as to be (at least approximately) mutually parallel and lie in particular in one plane (which during operation is preferably approximately vertical).

An assembly plate or a guide plate, respectively, for fastening to a door is particularly preferably fastened to or configured on the first component. The guide plate preferably comprises a cutout through which the coupling profile is guided. The cutout can in particular be configured as a passage opening, or the cutout can be configured so as to be, for example, U-shaped or V-shaped or L-shaped and surround the coupling profile on two, three, or more sides but does not have to have any fully circumferential wall about the coupling profile.

The cutout preferably has an available width which for guiding through the coupling profile is smaller than 3 times, 2 times, or 1.5 times a width of the coupling profile when viewed perpendicularly to the longitudinal extent of the latter.

The coupling profile is preferably in each case pivotably coupled to the third component and to the second connector unit.

The coupling profile is in particular configured so as to be elongate and curved (in particular in one plane). The coupling profile can have one or more curvatures and in particular be configured so as to be banana-shaped.

The coupling profile along the profile thereof preferably has at least two curvatures. In particularly preferred refinements, the coupling profile along the profile thereof has two opposite curvatures. The opposite curvatures can approximately cancel each other out such that the two ends of the coupling profile run so as to be almost parallel but laterally offset in relation to each other.

The coupling profile is in particular configured such that said coupling profile is disposed substantially in one plane.

The method according to the invention is used when moving two components that are movable relative to each other. A device having a drive installation is comprised herein. The drive installation has a drive housing and a drive shaft so as to cause a relative movement of a first in relation to a second of the components. When the drive shaft is coupled in a rotationally fixed manner to the second component and the drive housing is rotatably received on one of the two components, the drive housing, controlled by means of an actuator, is coupled in a rotationally fixed manner to the first component and uncoupled therefrom. When the drive housing is coupled in a rotationally fixed manner to the second component, the drive shaft, controlled by means of an actuator, is coupled in a rotationally fixed manner to the first component and uncoupled therefrom.

In an alternative method according to the invention for moving two components of a vehicle door that are movable relative to each other, a device having at least one drive installation is provided so as to cause a relative movement of a first in relation to a second of the components. Furthermore provided is at least one brake device so as to brake the movement of the two components that are movable relative to each other. According to the invention, the drive unit, preferably only the drive unit, can be, in particular completely, decoupled.

The brake device is preferably filled with a magnetorheological medium.

In a next alternative method according to the invention for smoothly moving a vehicle door by way of a drive unit and a brake unit, the drive unit is, in particular completely, decoupled in the non-energized state.

Further advantages and features of the present invention are derived from the exemplary embodiments which will be explained hereunder with reference to the appended figures.

DESCRIPTION OF THE INVENTION

Figure 1:
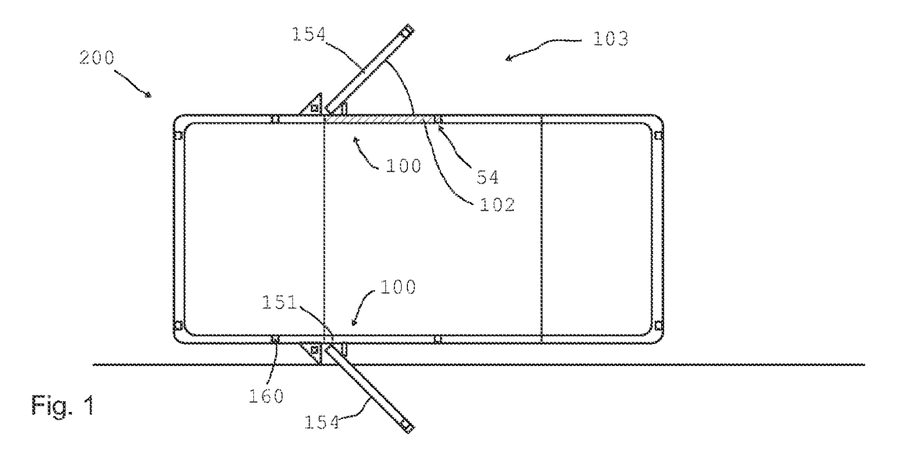
FIG. 1 shows a highly schematic plan view onto a motor vehicle having a device having a drivable door with a brake installation.

FIG. 1 shows the application of the device 50 according to the invention as a door component 100 on a motor vehicle 200 the latter here being a passenger motor vehicle. The motor vehicle 200 is illustrated in a schematic plan view from above. Two door installations 154 which here are embodied as doors are provided on the motor vehicle 200. Both doors are situated in the opened position 103. A door in the closed position 102 is plotted with hatched lines.

For damping the pivoting movement, or for braking the pivoting movement, of the doors 154 right up to blocking the latter, the door components 100 comprise in each case one brake installation 1 which is configured as a rotary brake or a rotary damper or the like. The door components comprise in each case connector units 151 and 152 of which one is connected to a support structure of the motor vehicle 200 while the other is connected to the door 154 such that a relative movement of the connector units 151 and 152 takes place in an opening or closing movement of the door 154. The connector units 151 and 152 move in a linear manner. A conversion to a rotary movement takes place, said conversion being braked or damped or blocked, respectively, by the rotary damper 1 of the device 50.

The device 50 can be configured as a door component 100 and comprise the brake installation 1 and connector units 151 and 152 and be used for damping or braking, respectively, the rotary movement of doors and flaps on a motor vehicle 200. The device 50 can also be configured as a damper installation 60 and comprise the brake installation 1 and connector units 151 and 152 and be used for damping rotary movements or, for example, linear movements between the connector units 151 and 152.

Figure 2A:
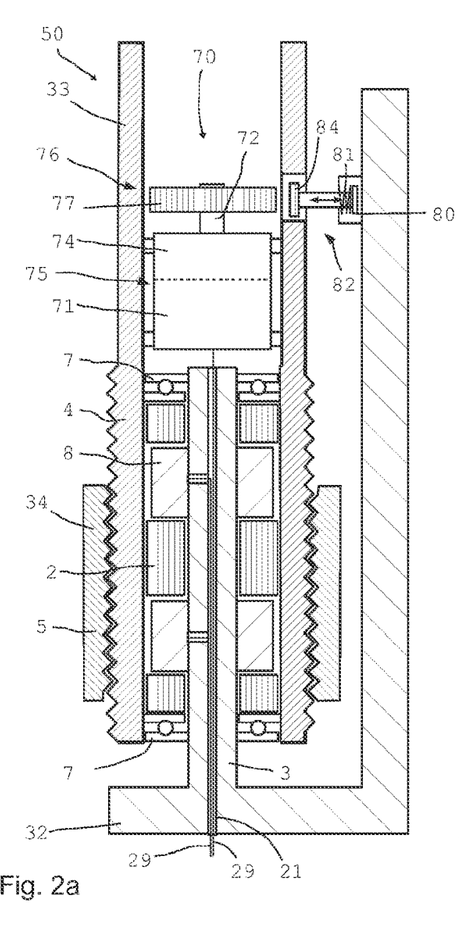
FIG. 2a shows a device having a drive installation and a brake installation in a schematic sectional view.
Figure 2B:
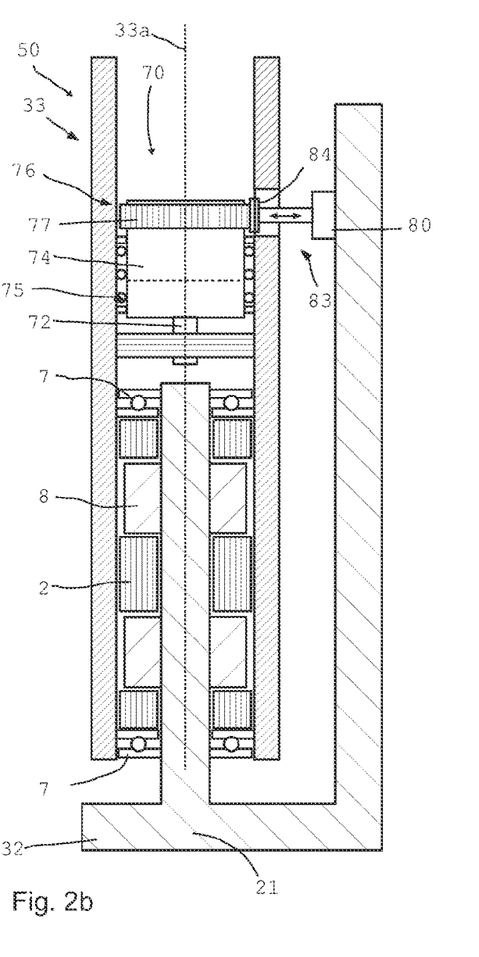
FIG. 2b shows a variant of the device as per FIG. 2a in a schematic sectional view.

FIGS. 2a and 2b show two variants of a device 50 having a drive installation 70 and a brake installation 1. For example, the device 50 as per FIG. 2a can be used as a controllable door in a building, wherein the first component 32 is connected to the frame or to the wall, and the second component 33 is connected or coupled to the door leaf. The second component 33 is rotatably mounted by way of the rotary receptacle 3 which here is configured as an axle unit. Bearings 7 are disposed between the axle unit 3, which can also be referred to as a coupling rod, and the second component 33. Electric coils 9 which in the axial direction are in each case adjoined by rotary elements 2 are disposed between the bearings 7. A magnetic field source 8 is made available by the electric coils 9. When a magnetic field is generated by the electric coils 9, this leads to a brake torque between the two components 32 and 33. A strong brake torque by way of the brake installation 1 can be applied in any arbitrary angular position such that any unintentional variation of the opening angle of the door installation 154 is prevented.

Additionally, the device 50 according to FIGS. 2a and 2b contains in each case one drive installation 70 which here is configured as an electric drive motor 75. The drive installation 70 comprises a drive housing 71, optionally a gearbox 74, and a drive shaft 72 on which a pinion 77 is disposed here.

In the exemplary embodiment according to FIG. 2a, the drive motor 75 by way of the drive housing 71 thereof is coupled in a rotationally fixed manner to the second component 33. In order for an automatic or controlled relative movement of the components 32 and 33 in relation to each other to be caused, the drive shaft 72, or the drive pinion 77, respectively, in the exemplary embodiment according to FIG. 2a must be coupled in a rotationally fixed manner to the first component 32.

This here takes place by way of an actuator 80 which comprises a pre-load unit 81 (here in the form of a helical spring). On account of the actuator 80, the engagement unit by way of the out-of-round operative face, the latter here being embodied as a toothing, is brought into contact with the external face of the pinion 77. On account thereof, a rotationally fixed coupling of the drive housing to the second component 33 and of the drive shaft 72 to the first component 32 is caused. A corresponding rotation of the two components relative to each other is caused by a rotation of the motor. Three or four revolutions of the drive motor 75 are typically required for opening a door by 90°, for example. Accordingly, the cable 29 which is here guided in the duct 21 is conjointly rotated by a corresponding number of revolutions. In a corresponding subsequent closing procedure, the cable is rotated in the opposite direction.

In the exemplary embodiment according to FIG. 2 the actuator 80 is biased toward the engaging position by a pre-load unit 81 in the form of a helical spring, for example. The coupling is cancelled by activating the actuator.

It is however also possible for the pre-load unit 81 to bias the actuator toward the uncoupling position. In this instance, the actuator is activated so as to cause a rotationally fixed coupling of the pinion 77 to the first component 32.

As opposed to the illustration as per FIG. 2b, the threaded spindle 4 in FIG. 2a is plotted on the second component 33 which interacts with the spindle nut 5 of the third component 34. A linear adjustment is caused by rotating the second component 33 relative to the third component 34 (cf. FIGS. 6c and 6d).

A slightly deviating embodiment is illustrated in FIG. 2b, wherein the second component 33 in FIG. 2b is also rotatably mounted on the axle unit as the rotary receptacle of the first component 32. A brake installation 1 for generating a variable brake torque by way of the brake installation 1 is again provided. The threaded spindle 4 and the spindle nut 5 of the third component 34 that interacts with the former are not illustrated in FIG. 2b.

As opposed to the exemplary embodiment as per FIG. 2a, the drive shaft 72 is coupled in a rotationally fixed manner directly to the second component 33. The drive housing 71 is rotatably received on the second component 33. A pinion 77 which is connected in a rotationally fixed manner to the drive housing 71 is configured on said drive housing 71. The drive housing 71, in a manner controlled by the actuator 80, is able to be coupled in a rotationally fixed manner to the first component 32. When the drive housing 71 is coupled to the first component 32 and the drive motor 75 is activated, the second component 33 is rotated relative to the first component 32. The cable 29 is correspondingly twisted also in this case.

Twisting of the connector cable 29 of the drive installation 70 however does not represent a problem in all cases, because only a few revolutions by the drive motor are required for a minor required pivot angle of less than 180°. This is not a problem by way of a corresponding power cable in the form of a buffer spring, for example, or by way of a collector ring.

Such a device can be advantageously used in many ways in the most diverse technical fields, for example in internal and external doors of buildings, public complexes, ships, aircraft, defense vehicles, comparatively large vehicles such as buses, tractors, or the like, and/or else in autonomous taxis, so-called robotic taxis, and/or in doors and cabinets of kitchens, and/or items of furniture.

Figure 3A:
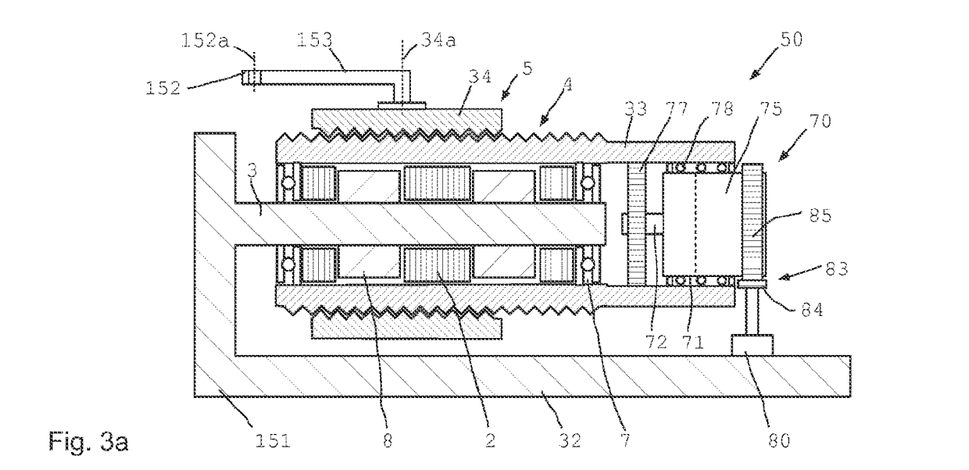
FIG. 3a shows another device having a drive installation and a brake installation in a highly schematic sectional view.
Figure 3B:
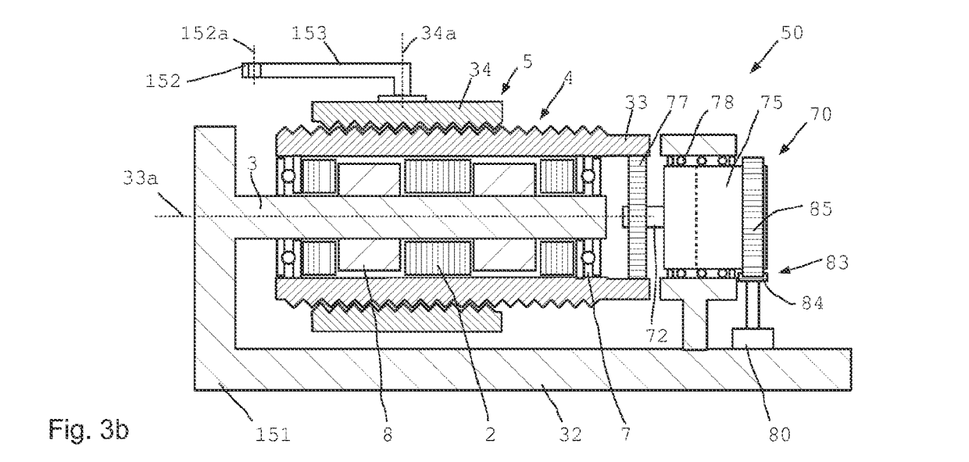
FIG. 3b shows a variant of the device as per FIG. 3a in a schematic sectional view.

FIGS. 3a and 3b show examples similar to those of FIGS. 2a and 2b, wherein the drive motor 75 in FIG. 3a by way of the housing 71 thereof is rotatably received within the second component 33. Should a rotationally fixed coupling be desired, the actuator 80 is deployed such that a form-fitting connection between the first component 32 and the drive housing 71 of the drive installation 70 is achieved. The shaft 72 in this instance is rotated in a rotation of the drive motor, on account of which a corresponding rotary movement of the second component 33 is achieved by way of the rotationally fixed coupling of the pinion 77 to the second component 33.

Figure 4:
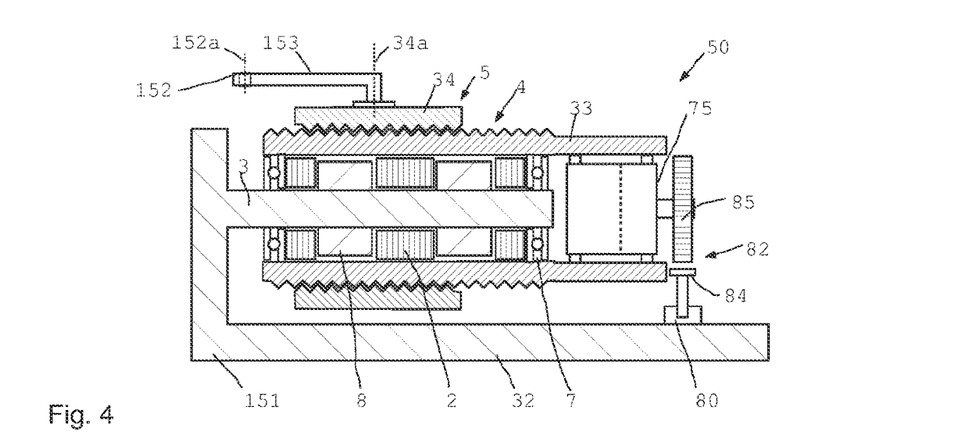
FIG. 4 shows a variant of the device as per FIG. 3a in a schematic sectional view.

In FIGS. 3a and 3b, and also in FIG. 4 here, a first spindle unit 4 is configured on the second component 33. Furthermore, a spindle unit 5 is configured on a third component 34. The internal toothing of the spindle unit 5 configured as a spindle nut engages in the external toothing of the spindle unit 4 embodied as a threaded spindle such that an axial displacement of the connector units 151 and in relation to each other takes place in a relative rotary movement of the second component relative to the third component.

On the third component 34 the coupling profile 153 is articulated on the spindle nut 5 so as to be pivotable by way of a pivot axle 34a. The pivot axle 34a herein lies so as to be transverse and here so as to be perpendicular to the rotation axle 33a of the second component 33. The coupling profile 153 is configured so as to be approximately bar-shaped and at the first end is connected to the third component 34 so as to be pivotable about the pivot axle 34a. The coupling profile 153 at the second end is connected to the second connector unit 152 so as to be pivotable about the pivot axle 152a. The second connector unit 152 can be attached to or configured on, respectively, the A-pillar or the B-pillar of a motor vehicle, for example.

FIG. 3b shows a variant in which the drive motor 75 by way of the drive housing 71 thereof is rotatably mounted on a receptacle of the first component 32. The drive shaft 72 is coupled in a rotationally fixed manner to the second component 33 by way of the pinion 77. The drive housing 71 is equipped with an out-of-round operative face 85 which is configured as an external toothing, for example. This out-of-round operative face 85 can be brought into contact with the out-of-round operative face 84 of the actuator 80 such that a rotationally fixed coupling of the out-of-round operative faces 84 and 85 is enabled. In this instance, the drive housing 71 is coupled in a rotationally fixed manner to the first component 32, and the drive shaft 72 is coupled in a rotationally fixed manner to the second component 33. Activating the drive motor 75 in this instance causes a direct rotation of the two components 32 and 33 relative to each other. Since a threaded spindle 4 which engages with the threaded nut 5 of the third component 34 is configured on the second component 33, an axial displacement of the connector units 151 and 152 in relation to each other is thus caused by way of the motor.

In the uncoupled position, when the actuator 80 is not coupled in a rotationally fixed manner to the drive housing 71, a simple manual adjustment of the angular position of the components 33 and 32 in relation to each other can be effected. The drive motor conjointly rotates when the two components are rotated relative to each other. On account thereof, the torque required for rotating the two components 32 and 33 relative to each other is significantly lower than when the drive shaft 72 and an adjoining gearbox would have to be conjointly rotated.

The shaft 72 can also be a torsion element or a spring element. Said shaft 72 can also be configured as a resilient energy accumulator and/or be enhanced with a resilient energy accumulator.

The device 50, or the drive unit, respectively, herein does not mandatorily have to be disposed so as to be coaxial with the brake device 1. Said device 50 can also be disposed so as to be parallel or offset to said brake device 1. The transmission of torque herein can take place by way of, for example, a V-belt, a timing belt, gear wheels, a chain drive, friction wheels, or the like. A timing belt pulley can be attached to the shaft 72, for example. The component 33 at the distal end can have a timing belt profile which in this instance is operatively connected to the timing belt pulley of the device 50, or of the drive unit, respectively, by means of a timing belt.

FIG. 4 shows a further variant in which the drive motor 75 is received in a rotationally fixed manner in the second component 33. The drive shaft is equipped with an out-of-round operative face 85 which can be coupled to a correspondingly out-of-round operative face 84 of the actuator 80.

A third component 34 is also provided in the exemplary embodiment as per FIG. 4, wherein the components 33 and 34 have mutually engaging threads or threaded portions, respectively. On account of the spindle units 4 and 5, an axial displacement of the first and the third component in relation to each other is achieved in a rotary movement of the spindle units relative to each other.

Figure 5:
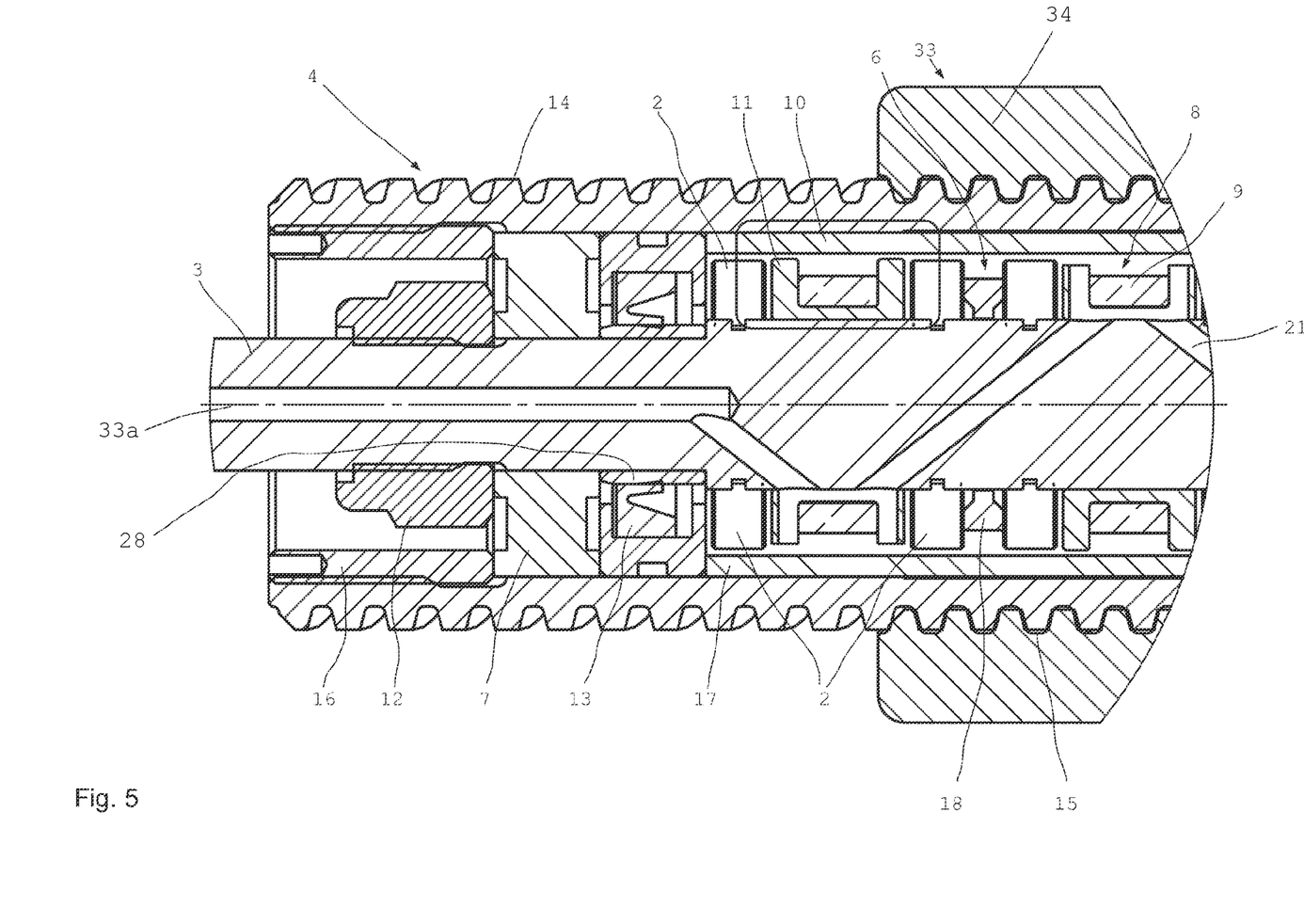
FIG. 5 shows an enlarged schematic detail for devices as per FIGS. 3, 3a, and FIG. 4.

An enlarged detail is depicted in FIG. 5, wherein the profile of the magnetic field 10, or magnetic flux lines of a magnetic circuit, respectively, are plotted in an exemplary manner here.

The magnetic field generated by the electric coil 9 as a magnetic field source 8 runs through a portion of the magnetically conducting sleeve 17 and passes through a rotary element 2 that is disposed so as to neighbor the electric coil, and enters the coupling rod, or rotary receptacle 3, that is likewise composed of a ferromagnetic material, and returns axially to the next rotary element 2 where the magnetic flux lines again enter radially through a rotary element 2 and into the sleeve 17 where said magnetic field is closed. Two separate rotary elements 2 are preferably provided in each case between two axially neighboring coils. A plurality of magnetic circuits which are axially mutually spaced apart can be provided. Each magnetic circuit can comprise two rows of rotary elements, for example, which are in each case disposed so as to be distributed on the circumference to the right and to the left of an electric coil. It applies here that the more magnetic circuits/rotary element units are embodied, the higher the maximum brake torque.

It is also possible for elongate rotary elements to be provided in the axial direction such that one end of an elongate cylindrical rotary element is passed through by the magnetic field of the neighboring electric coil 9 on one axial side, while the other end of the cylindrical rotary element 2 is passed through by the magnetic field of the next electric coil 9.

A duct 21 which comprises branching ducts, for example, which run to the individual electric coils 9, for example, so as to supply the individual electric coils 9 in a targeted manner with power can be configured so as to be central in the interior of the coupling rod 3, or of the rotary receptacle 3, respectively.

The coupling rod, or the rotary receptacle 3, respectively, is in particular fixedly connected to the first component 32 and may optionally be configured so as to be integral thereon or else be screw-fitted or welded to said first component 32.

It is possible for spacer rings 18 to be in each case provided between the individual series of rotary elements 2 so as to separate the individual magnetic circuits from each other.

Clearly to be seen in FIG. 5 is also the external thread 14 of the threaded spindle 4 that engages with the internal thread 15 of the spindle nut 5.

A sleeve 17 which is connected in a rotationally fixed manner to the threaded spindle 4 as the second component 33 and is adhesively bonded to the latter, for example, is inserted in the interior of the component 33. The use of a sleeve 17 composed of a ferromagnetic material enables the threaded spindle 4 per se to be produced from a plastics material, for example, wherein the use of special plastics material is advantageous here. This leads to a significant saving in terms of weight. Moreover, self-lubrication of the mutually engaging threaded regions of the spindle units 4 and 5 can thus be achieved such that the device 50 can be operated in a maintenance-free and low-friction manner.

A seal 13 which comprises, for example, a shaft seal ring and in a contacting manner seals all gaps is disposed so as to neighbor the rolling bearing 7. Since the rotary receptacle 3 is preferably composed of a ferromagnetic material and of a relatively soft steel, for example, a raceway 28 composed of a hardened material is preferably fitted onto the rotary receptacle 3 in the region of the seal 13 so as to prevent wear.

A plurality of magnetic circuits are preferably accommodated in the interior, in the cavity between the rotary receptacle 3 and the sleeve 17 (should the threaded spindle be composed of plastics material, for example) or the inner wall of the threaded spindle 4 (should the latter be composed of a ferromagnetic material and no sleeve 17 be present), respectively, and the external surface of the rotary receptacle 3. Electric coils 9 in the hollow-cylindrical interior herein are either wound directly onto the rotary receptacle 3 or onto coil holders 11 which are subsequently push-fitted onto the coupling rod 3.

A multiplicity of rotary elements or rolling elements 2 on account of which the magnetic field of the magnetic circuit is closed are preferably accommodated so as to neighbor the electric coils 9 on each axial side. For example, eight or ten rotary elements 2 can be disposed so as to be distributed on the circumference at one axial position, for example.

Figure 6A:
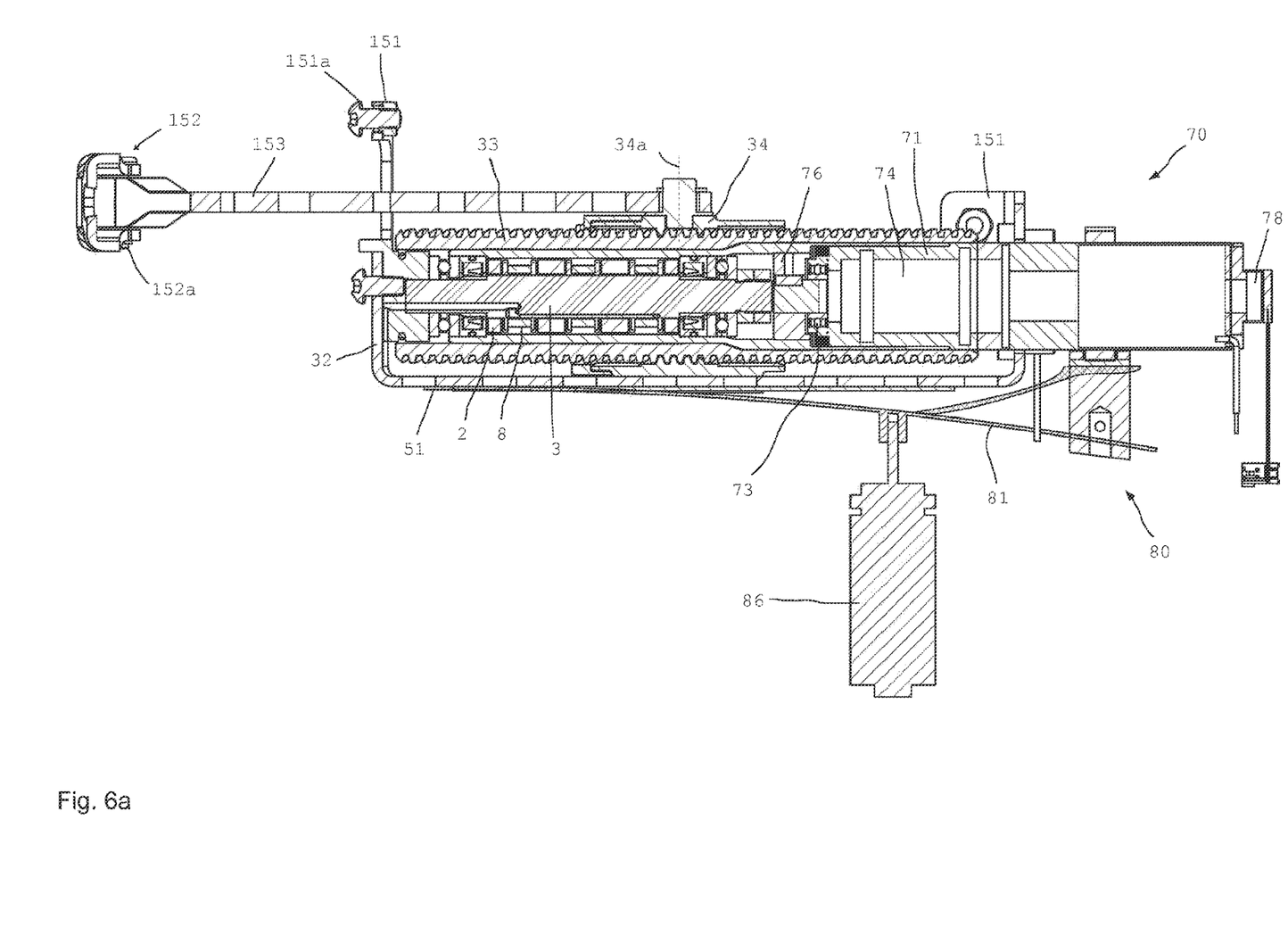
FIG. 6a shows a sectional view of a further device.

FIG. 6a shows a further exemplary embodiment in a sectional view, wherein a door component 100 is provided as a device 50 here. The device 50 comprises connector units 151 and 152 for assembly on a motor vehicle. The first component 32 here is fixedly connected to the door component 100, for example. A rotary receptacle 3, here configured as a coupling rod 3, is provided on the first component 32. The second component 33 is rotatably mounted on the rotary receptacle 3, wherein the second component 33 on the external side comprises a threaded spindle 4 and to this extent is configured as a spindle unit 4.

Provided is a third component 34 which is configured as a spindle unit 5. The spindle unit 5 comprises a spindle nut 5 having an internal thread which meshes with the external thread of the spindle unit 4 of the second component 33. An axial movement of the two connector units relative to each other is converted to a rotary movement by way of the mutually engaging spindle units 4 and 5. A brake installation 1 for braking the rotary movement is configured in the interior of the second component 33.

The coupling profile 153 is received on the third component 34 so as to be pivotable about the pivot axle 34a. The pivot axle 34a can be configured as a bolt or an axle stub on the third component 34, for example, and pivotably receive a boss of the coupling profile 153. The in particular bar-shaped coupling profile 153 at the second end is connected to the second connector unit 152 so as to be pivotable about the pivot axle 152a. The pivot axle 152a can also be configured as a bolt or an axle stub on the second connector unit 152, for example, and pivotably receive a boss of the coupling profile 153.

A drive installation 70 for active controlling is received in the second component 33. The drive housing 71 herein is rotatably mounted on a drive receptacle 73. A rotationally fixed connection between the drive housing 71 of the drive motor 75 and the first component 32 can be achieved by the actuator 80 which here comprises a drive 86. The drive 86 can be repositioned in the vertical direction and thus establish a rotationally fixed connection of the drive housing to the first component 32.

The construction in the interior of the second component 33 preferably corresponds to the construction in the interior of one of the exemplary embodiments of FIGS. 3a, 3b, and 4, wherein the different receptacle and mounting of the drive shaft and of the drive housing is to be noted.

Figure 6B:
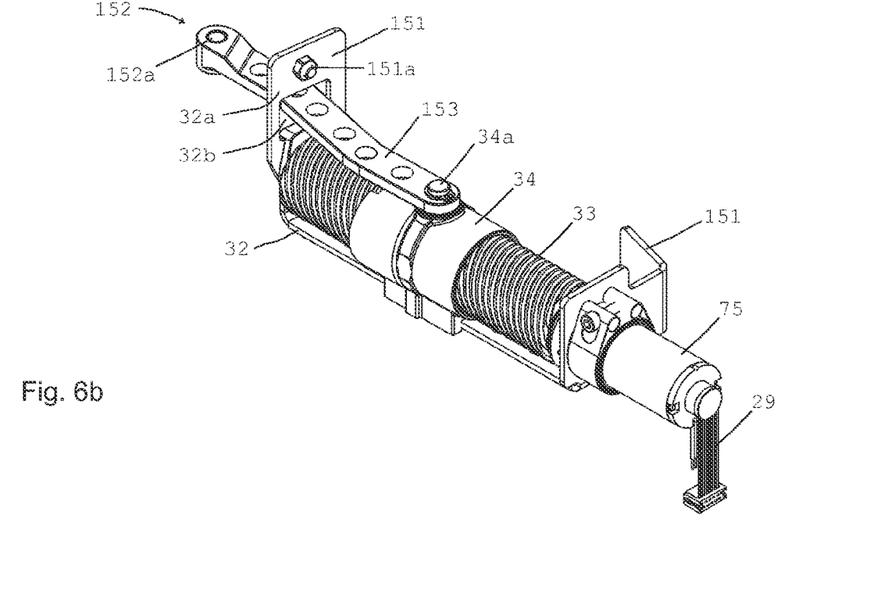
FIG. 6b shows a perspective illustration of the device as per FIG. 6a in a central position.

FIG. 6b shows a perspective view of the device 50 as per FIG. 6a in a central position in which the spindle nut 5 is situated in an intermediate position. The coupling profile 153, which can be seen in a perspective view here and is configured so as to be elongate, extends across a central distance through the cutout 32b on the plate, or the guide plate 32b, respectively. The guide plate 32b is fixedly connected to the first component 32 and is in particular configured so as to be integral thereon.

It can be seen that the cutout 32b is configured so as to be only slightly wider than the coupling profile 153. The illustrated design enables a very narrow construction in which the available width can be smaller than double the width of the coupling profile 153 when viewed perpendicularly to the longitudinal extent of the latter.

The first component 32 can be substantially composed of bent or canted sheet metal and be screw-fitted directly to a door installation. The device 50 is in particular assembled in the interior of the door installation or in the interior of the door construction of the door installation.

Figure 6C:
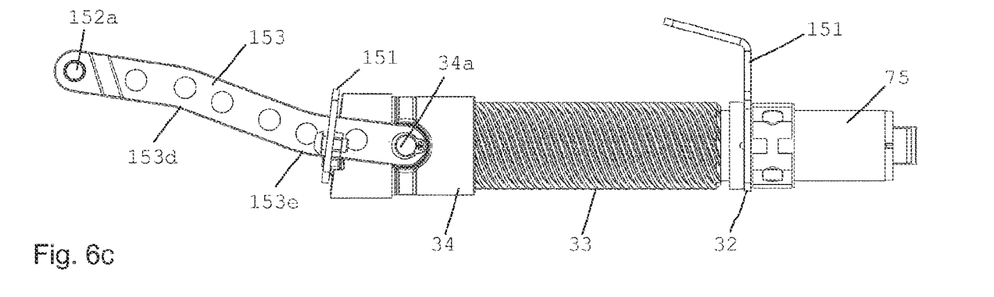
FIG. 6c shows a plan view onto the device as per FIG. 6a in a deployed position.

FIG. 6c shows a plan view onto a completely deployed coupling profile 153. The device is situated in the deployed terminal position, and the coupling profile 153 extends to a maximum through the cutout 32b. In the plan view as per FIG. 6c it can be readily seen that the coupling profile has a plurality, and here two, curvatures 153d and 153e which here run in opposite directions. On account thereof, the ends of the coupling profile 153 extend so as to be mutually parallel and are disposed so as to be offset transversely to the longitudinal extent by less than a width. The exact shape of the profile depends on the installation situation. In any case, a narrow construction which also when in operation requires only a minor space requirement when installed in the interior of a door installation is achieved here.

Figure 6D:
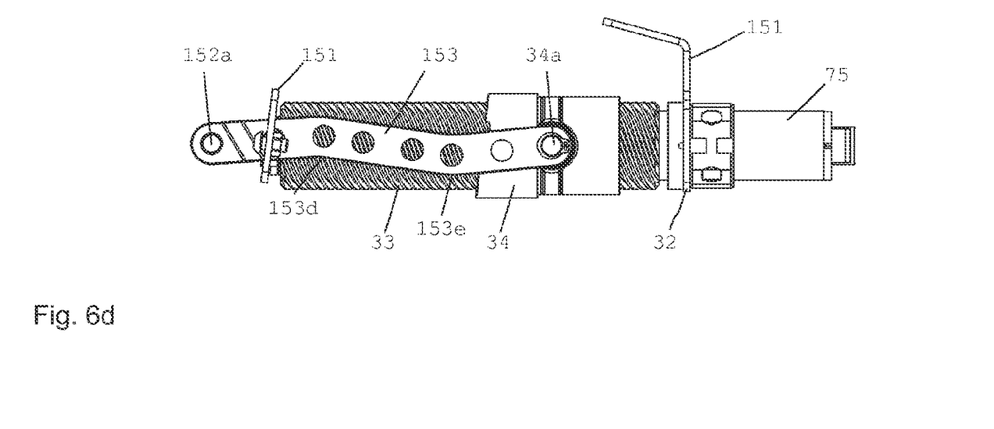
FIG. 6d shows a plan view onto the device as per FIG. 6a in a retracted position.

FIG. 6d shows a plan view onto the device as per FIG. 6a in a largely retracted position. The coupling profile 153 is largely retracted and does not extend laterally beyond the diameter of the second component 33 or of the third component 34.

It can be seen in the cut-away longitudinal section as per FIG. 6a that the device 50 has two components 32, 34 that are movable relative to each other, wherein the first component 32 is equipped with a rotary receptacle 3 on which the second component 33 is rotatably received. A third component 34 is coupled to the second component 33. Comprised are two connector units 151, 152 that are movable relative to each other, wherein the first connector unit 151 is configured on the first component 32, and the second connector unit 152 is pivotably coupled to the third component 34.

A controllable brake installation is thus comprised, wherein the brake installation 1 is configured as a controllable rotary brake so as to in a controlled manner at least partially damp a movement of a door installation 154 between a closing position 102 and an opening position 103. The pivot axle 34a herein is aligned so as to be transverse to a rotation axle 33a of the second component 33.

The first connector unit 151 is rigidly connected to the first component 32, and the third component 34 is pivotably coupled to the second connector unit 152 by way of a bar-shaped coupling profile 153. The coupling profile 153 at a first end is pivotably connected to the third component 34, and at a second end is pivotably connected to the second connector unit 152.

As is shown in FIGS. 6b, 6c, and 6d, a guide plate 32a for fastening to a door installation 154 is fastened to the first component 32. The guide plate 32a comprises a cutout 32b through which the coupling profile 153 is routed. The coupling profile 153 is pivotably coupled to the third component 34 and to the second connector unit 152 and is configured so as to be elongate and curved.

Figure 7:
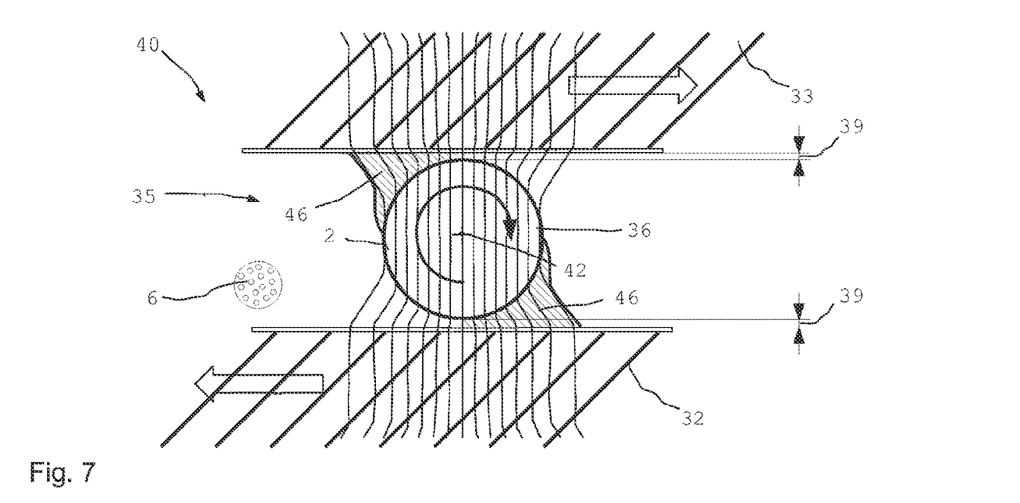
FIG. 7 shows a sectional schematic diagram.

FIG. 7 shows a schematic diagram of the functional mode of the magnetorheological transmission device 40 using the basic principle of the rotary damper, or the brake installation 1, respectively. This figure is in principle also depicted already in WO 2017/001696 A1. The respective description and the entire content of WO 2017/001696 A1 is therefore incorporated in the disclosure of the present invention by reference.

FIG. 7 shows two components 32 and 33, the relative movement thereof is intended to be damped or influenced in a targeted manner, respectively, by the transmission device 40. To this end, a plurality of rotary elements 2 which are embedded in a magnetorheological fluid 6 are disposed in a gap 35 between the components 32 and 33. The rotary elements 2 function as magnetic field concentrators which in the case of an applied magnetic field and the relative movement of the components 32 and 33 in relation to each other leads to a wedge effect, wherein wedge-shaped regions 46 result, in which the magnetorheological particles accumulate and by way of the wedge effect effectively brake any further rotation of the rotary elements 2 and a relative movement of the components 32 and 33 in relation to each other.

The available spacing 39 between the rotary element 2 and the surface of the components 32 and 33 herein is in principle larger than a typical or average or maximum particle diameter of a magnetorheological particle in the magnetorheological fluid. On account of this "MRF wedge effect" a significantly more intense influence can be achieved than would be expected. This leads in particular to a high static force which can be used as a retention force.

All of the rotary dampers, or brake installations 1, respectively, shown in the exemplary embodiments here preferably function according to this "MRF wedge effect".

Figure 8:
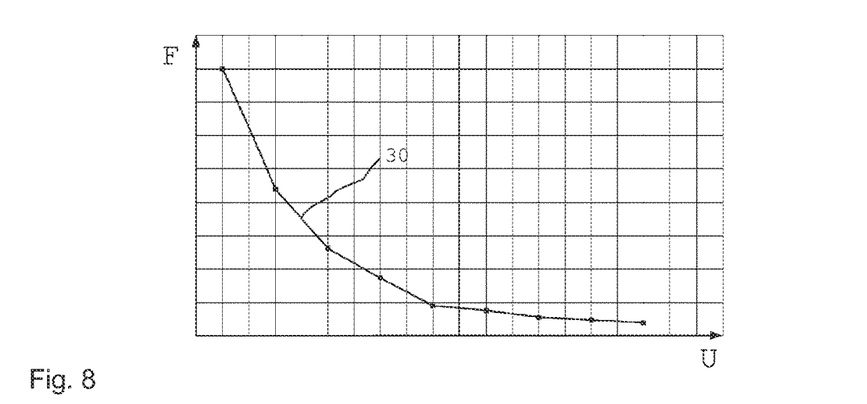
FIG. 8 shows the force profile of the device as per FIG. 7.

The high static force can be effectively utilized as a retention force and can advantageously be exploited as is shown in FIG. 8 in which the force profile of the brake force of the magnetorheological transmission device 40, or of the brake installation 1, respectively, is illustrated over the rotating speed of the rotary elements (and in analogous manner also of the rotatable spindle unit). It is demonstrated that a very high brake force is generated in the case of stationary rotary elements 2. When the user overcomes the brake force which holds the door open, the brake force significantly drops at an increasing rate, even in the case of a magnetic field still being applied, such that the user can easily close the door upon overcoming the sufficient retention force even in the case of a magnetic field being applied.

This effect leads to a high retention force being in principle generated in each arbitrary angular position, the user however being able to overcome said retention force rather easily in order to close the door. A very comfortable function is provided on account thereof. The closing function can be assisted in a motorized manner such that only light forces have to be applied at any time.

Figure 9:
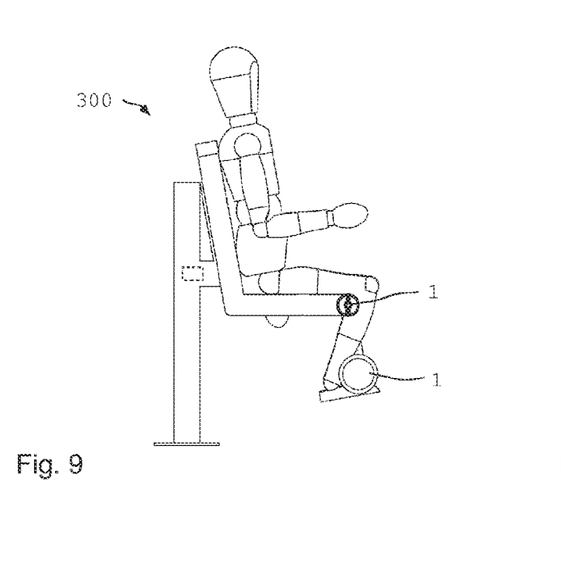
FIG. 9 shows a schematic view of a training apparatus.

FIG. 9 shows an exemplary embodiment, wherein the device 50 is configured as a training apparatus 300. A plurality of devices 50 and/or brake installations 1 which possess in each case separate drive installations 70 and brake installations 1 can be comprised herein.

Figure 10:
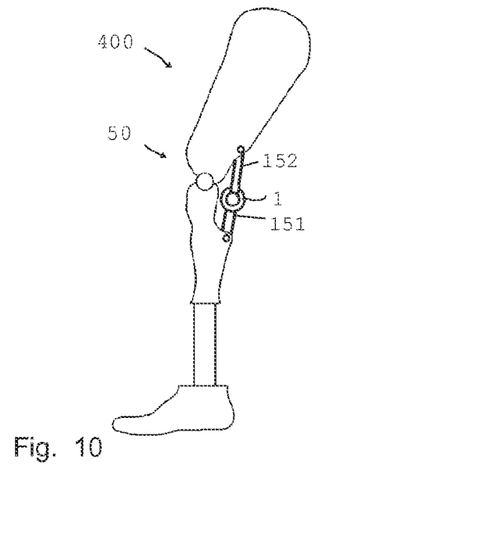
FIG. 10 shows a schematic view of a prosthesis.

FIG. 10 shows a design embodiment of a prosthesis, wherein the prosthesis 400 here possesses a device 50. A brake installation 1 on the device 50 is also provided between the connector units 151 and 152.

Additionally, the following possibilities for embodying doors of motor vehicles can be implemented:
1. Active doors. This means that the door actively moves upon pressing a button or by another control command, driven by an electric motor, and is braked by means of a brake. All this takes place without any external influence. Sensors identify necessary stop positions.
2. Passively embodied doors. The door is moved by the user and per se is passive (and is maximally braked). Intelligent damping can take place by means of sensors, and stopping can take place in front of an obstacle, for example.
3. Passive "active" door: The electric motor etc., is decoupled and the otherwise active door can be moved passively using a minor and in any case justifiable effort in terms of force.

A new possibility is a semi-active door:
The door is moved by the user as in the preceding mode 2 (passive), the electric motor in combination with the brake however assists the movement. The door can thus be moved in an arbitrary manner using one finger, for example. As long as the finger (hand) guides the door, the door follows the hand movement or the prompt, respectively, of the user with a minimal counterforce. The force by way of which the door follows can be pre-set (for example in the vehicle settings menu; or in the ignition key; in an app, et cetera. The door can also be slightly nudged and in this instance moves very slowly so as to be stopped again using a finger. The human "guides" the door, the door (preferably) not doing anything (or almost anything) in a self-acting manner. The art herein lies in second-guessing the user's demand (sensor . . . ) and to control the motor such that the door does not make any movements which are "unnatural" (jolting, excessive braking, too stiff; changes of the rotating direction are critical . . . ).

This is also possible on an incline. The electric motor in this instance compensates the variable forces (the door would otherwise move more easily in one direction and more sluggishly in the other). The door always moves in the same "elegant" manner, or free of gravity, so to speak.

The door can be fixed (braked) in the position desired (guided thereto) by the user by means of a movement pattern or a button such that said user can hold said door when entering or exiting (entering/exiting assistant).

One advantage of this solution is moreover that the decoupling could be dispensed with. This is a great advantage in terms of the costs, the weight, and the installation space.

It is advantageous for a user to be able to passively close a car door. This is particularly advantageous when a minor closing force is required.

The door in this instance does not open "by itself" but is guided with a minimum effort in terms of force. The drive motor provides the assistance, and the brake installation when required brakes appropriately such that a minimum force is required at all times.

The electric motor including the gearbox should be relatively strong since the door forces and repositioning speeds are high (exiting assistant: up to 2000 N; activation force up to 1000 N). It is therefore possible that the motor including the gearbox (such as in the case of the electric tailgate) is audible, this not being desirable. Gearboxes having plastic gear wheels and an encapsulation in the form of sound insulation are remedies to only a limited extent.

In most vehicles, a loudspeaker is also disposed in the door. Said loudspeaker in most instances is only a few centimeters away from the active door adjuster (=drive motor). A counter-noise can be emitted by way of the loudspeaker when the door adjuster is active. The noise of the door adjuster does not vary very much in the frequency spectrum. The door adjuster is moreover actuated; it is thus known what said door adjuster is doing or should be doing, respectively. Said door adjuster is not an undefined source of noise. The load is known by virtue of the sensor signals (for example a yaw sensor: inclination of the vehicle). Operating with a counter-noise can thus take place in a very efficient manner.

Controlling a door installation by voice input is preferably possible in all design embodiments. To this end, voice recognition can be carried out (locally or remotely). The transmission of commands can take place by voice. Possible commands are, for example:
"Open door" or else "open"
"Close door" or else "close"
"Stop door"
"Block door" (in the case of the exiting assistant, for example)
"Close door quietly"
It is also possible to refer to a specific door:
"Close front left door" or "open", etc.

In the case of an integrated exiting assistant, the latter can have or require a dedicated button for activation. This can be disadvantageous (where is said button to be placed; cable connections, etc.). This can be performed in a simple and cost-effective manner using a voice command. It can be possible and necessary for a voice command to be confirmed before said voice command is executed. The execution may also be refused, for example while driving. At least one microphone is preferably installed.

Without being limited to the following, the drive motor 75 in all design embodiments can also be a synchronous motor, an asynchronous motor, a disk rotor, a piezo motor, or an axial gap motor, with or without a gearbox 74.

Without being limited to the following, the gearbox 74 can be a planetary gearbox, a conventional gearbox, a harmonic drive gearbox (strain wave gear), a CVT. The transmission elements (such as the gear wheel, for example) herein can be composed of steel, plastics material, fiber-reinforced materials, non-ferrous metals, or similar.

LIST OF REFERENCE SIGNS

1 Brake installation, rotary brake, rotary damper
2 Rotary element, rolling element
3 Rotary receptacle, axle unit, coupling rod
4 Spindle unit, threaded spindle
5 Spindle unit, spindle nut
6 Magnetorheological fluid
7 Bearing
8 Magnetic field source
9 Electric coil
10 Magnetic field
11 Coil holder
12 Threaded nut
13 Seal
14 External thread
15 Internal thread 16 Drilled nut
17 Sleeve
18 Spacer ring
19 Screw-in part
20 Fastening bracket
21 Duct
22 Fastening bore
23 Angle sensor
24 Pivot axle
25 Articulation
26 Fastening bore
27 Fastening bolt
28 Raceway
29 Cable
30 Force profile
32 Component
32a Guide plate
32b Cutout
33 Component
34 Component
34a Pivot axle
35 Gap
36 Separate part
39 Available spacing
40 Transmission device
42 Rotation axle
46 Wedge shape
50 Device
51 Path sensor
60 Damper installation
70 Drive installation
71 Drive housing
72 Drive shaft
73 Drive receptacle
74 Gearbox
75 Drive motor
76 Catch
77 Pinion
78 Angle sensor
80 Actuator
81 Pre-load unit
82 Uncoupled position
83 Coupling position
84 Out-of-round operative face of 80
85 Out-of-round operative face of
86 Drive
100 Door component
102 Closing position
103 Opening position
151 Connector unit
152 Connector unit
152a Pivot axle
153 Coupling profile
153d Curvature
153e Curvature
154 Door installation
160 Sensor
200 Motor vehicle
300 Training apparatus
400 Prosthesis

The invention claimed is:

1. A device, comprising:
at least two components that are movable relative to each other, said at least two components including a first component and a second component, and said at least two components further include a third component coupled to said second component;
two connector units that are movable relative to one another, and wherein a first said connector unit is coupled to said first component or formed thereon, and wherein a second said connector unit is coupled to said second component or to said third component;
two mutually engaging spindle units disposed between said two connector units:
a cylindrical sleeve composed of a magnetically conducting material being received in said first spindle unit and connected in a rotationally fixed manner to said first spindle unit;
a drive installation having a drive housing and a drive shaft, said drive installation being configured to cause a relative movement of said first component relative to said second component; and
wherein:
said drive shaft is coupled in a rotationally fixed manner to said second component, and said drive housing is rotatably received on one of said first and second components and, under control by an actuator, is configured to be coupled in a rotationally fixed manner to said first component and to be uncoupled therefrom; or
said drive housing is coupled in a rotationally fixed manner to said second component, and said drive shaft, under control by the actuator, is configured to be coupled in a rotationally fixed manner to said first component and to be uncoupled therefrom.

2. The device according to claim 1, wherein said first component is equipped with a rotary receptacle and said second component is rotatably received on said rotary receptacle.

3. The device according to claim 2, wherein an annular-cylindrical cavity is formed radially between said rotary receptacle and said first spindle unit.

4. The device according to claim 3, wherein said cavity is partially or completely filled with a magnetorheological medium.

5. The device according to claim 3, further comprising a controllable brake installation configured to influence a movement between said components.

6. The device according to claim 5, wherein said brake installation is a controllable rotary brake configured for, in a controlled manner, at least partially damping a movement of a door installation between a closing position and an opening position.

7. The device according to claim 5, wherein said brake installation is disposed to be effective between said rotary receptacle of said first component and said second component.

8. The device according to claim 5, wherein said brake installation is a magnetorheological transmission device comprising at least one electric coil.

9. The device according to claim 1, wherein said spindle units including a threaded spindle and a spindle nut.

10. The device according to claim 1, wherein said second component is a threaded spindle and said third component is a spindle nut.

11. The device according to claim 10, wherein said first component is equipped with a rotary receptacle and said second component is rotatably received on said rotary receptacle, and wherein a relative mutual axial position of said spindle units varies in a relative movement of said connector units in relation to each other, and wherein said spindle nut radially surrounds said threaded spindle, said threaded spindle is at least 30% longer than said spindle nut, and said threaded spindle is rotatable in relation to said spindle nut and in relation to said rotary receptacle.

12. The device according to claim 1, wherein said drive installation comprises an electric drive motor.

13. The device according to claim 1, wherein said drive installation comprises a gearbox and said drive shaft forms a gearbox shaft of said gearbox.

14. The device according to claim 1, further comprising a pre-load unit biasing said actuator toward an uncoupled position.

15. A device, comprising:
at least two components that are movable relative to each other, said at least two components including a first component and a second component, said at least two components including a third component coupled to said second component, and said first component being equipped with a rotary receptacle and said second component being rotatably received on said rotary receptacle;
two connector units being movable relative to one another, a first said connector unit being coupled to said first component or formed thereon, a second said connector unit being coupled to said second component or to said third component, and two mutually engaging spindle units disposed between said two connector units;
an annular-cylindrical cavity being formed radially between said rotary receptacle and said first spindle unit, and said cavity being partially or completely filled with a magnetorheological medium;
a drive installation having a drive housing and a drive shaft, said drive installation being configured to cause a relative movement of said first component relative to said second component; and
wherein:
said drive shaft is coupled in a rotationally fixed manner to said second component, and said drive housing is rotatably received on one of said first and second components and, under control by an actuator, is configured to be coupled in a rotationally fixed manner to said first component and to be uncoupled therefrom; or
said drive housing is coupled in a rotationally fixed manner to said second component, and said drive shaft, under control by the actuator, is configured to be coupled in a rotationally fixed manner to said first component and to be uncoupled therefrom.

16. The device according to claim 15, wherein a cylindrical sleeve composed of a magnetically conducting material is received in said first spindle unit and connected in a rotationally fixed manner to said first spindle unit.

17. A device, comprising:
at least two components that are movable relative to each other, said at least two components including a first component and a second component, and said at least two components including a third component coupled to said second component;
two connector units that are movable relative to one another, and wherein a first said connector unit is coupled to said first component or formed thereon, and wherein a second said connector unit is coupled to said second component or to said third component;
two mutually engaging spindle units disposed between said two connector units;
a drive installation having a drive housing and a drive shaft, said drive installation being configured to cause a relative movement of said first component relative to said second component;
a controllable brake installation configured to influence a movement between said components, and said brake installation being a magnetorheological transmission device comprising at least one electric coil; and
wherein:
said drive shaft is coupled in a rotationally fixed manner to said second component, and said drive housing is rotatably received on one of said first and second components and, under control by an actuator, is configured to be coupled in a rotationally fixed manner to said first component and to be uncoupled therefrom; or
said drive housing is coupled in a rotationally fixed manner to said second component, and said drive shaft, under control by the actuator, is configured to be coupled in a rotationally fixed manner to said first component and to be uncoupled therefrom.

* * * * *